(12) United States Patent
Bushnell et al.

(10) Patent No.: US 9,886,057 B2
(45) Date of Patent: Feb. 6, 2018

(54) ELECTRONIC DEVICE WITH ENHANCED PRESSURE RESISTANT FEATURES

(71) Applicant: Apple Inc., Cupertino, CA (US)

(72) Inventors: Tyler S. Bushnell, Mountain View, CA (US); William C. Lukens, San Francisco, CA (US); Brad G. Boozer, Saratoga, CA (US); Jason C. Sauers, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/238,450

(22) Filed: Aug. 16, 2016

(65) Prior Publication Data

US 2017/0082509 A1 Mar. 23, 2017

Related U.S. Application Data

(60) Provisional application No. 62/222,131, filed on Sep. 22, 2015.

(51) Int. Cl.
*G01L 1/00* (2006.01)
*G06F 1/16* (2006.01)
*G01L 1/14* (2006.01)

(52) U.S. Cl.
CPC ............ *G06F 1/1626* (2013.01); *G01L 1/142* (2013.01); *G06F 1/1637* (2013.01); *G06F 1/1656* (2013.01); *G06F 1/1684* (2013.01); *G06F 2200/1633* (2013.01)

(58) Field of Classification Search
CPC .... G06F 1/1637; G06F 1/1626; G06F 1/1656; G06F 1/1684; G06F 2200/1633; G01L 5/0028; G01L 1/142

USPC ...................................................... 73/862.68
See application file for complete search history.

(56) References Cited

U.S. PATENT DOCUMENTS

| | | | | |
|---|---|---|---|---|
| 4,388,668 A * | 6/1983 | Bell | ...................... | G01L 9/0075 361/283.4 |
| 4,445,386 A * | 5/1984 | Nielsen | .................... | G01B 7/22 73/780 |
| 4,686,861 A | 8/1987 | Morii | | |
| 2011/0272219 A1* | 11/2011 | Fried | ................. | B32B 17/10036 187/325 |

(Continued)

FOREIGN PATENT DOCUMENTS

CN 202494542 U 10/2012

*Primary Examiner* — Max Noori
(74) *Attorney, Agent, or Firm* — Downey Brand LLP (57) ABSTRACT

An electronic device is disclosed. The electronic device may include a sealing element between a protective cover and a housing of the electronic device. The sealing element may provide a seal between the protective cover and the enclosure, as well as monitor or detect a force to the protective cover. Also, one or more support members may surround the sealing element to provide protection against a material (such as liquid) entering an opening between the protective cover and the enclosure. Alternatively, or in combination, the sealing element may include several openings, each of which may include a restraining element to limit movement of the sealing element. Also, a blocking element may be placed at or near an edge of the enclosure to provide additional reinforcement if the sealing element is laterally displaced. The blocking element may include an operational component of the electronic device, such as an antenna.

20 Claims, 11 Drawing Sheets

(56) References Cited

U.S. PATENT DOCUMENTS

| | | | |
|---|---|---|---|
| 2013/0149186 A1* | 6/2013 | Hachenberg | B22F 3/003 |
| | | | 419/57 |
| 2014/0170446 A1* | 6/2014 | Elian | G01M 3/227 |
| | | | 429/61 |
| 2014/0333035 A1 | 11/2014 | Schemmann et al. | |
| 2015/0362394 A1* | 12/2015 | Shimoyama | G01L 9/0001 |
| | | | 73/702 |
| 2016/0058375 A1* | 3/2016 | Rothkopf | G06F 1/1643 |
| | | | 600/301 |
| 2017/0089773 A1* | 3/2017 | Lukens | G01L 1/142 |

* cited by examiner

ELECTRONIC DEVICE WITH ENHANCED PRESSURE RESISTANT FEATURES

CROSS-REFERENCE TO RELATED APPLICATION(S)

This application claims the benefit of priority under 35 U.S.C. § 119(e) to U.S. Provisional Application No. 62/222,131, filed on Sep. 22, 2015, and titled "ELECTRONIC DEVICE WITH ENHANCED PRESSURE RESISTANT FEATURES," the disclosure of which is incorporated herein by reference in its entirety.

FIELD

The described embodiments relate to an electronic device. In particular, the described embodiments relate to an electronic device that may include a sealing element that provides a seal between two or more parts. In addition to its sealing capabilities, the sealing element also provides a force detection sensor that detects a force (or forces) applied to one of the parts. The sealing element may be reinforced by one or more structural components to prevent or limit unwanted movement of the sealing element.

BACKGROUND

Electronic devices are known to have multiple parts sealed together. The region in which the parts are sealed together may define an interface region. The interface region may allow ingress of liquids or contaminants that press against a gasket, causing displacement of the gasket. As a result, the gasket may no longer provide a sufficient seal against ingress, which may allow for a liquid or contaminant to enter through the interface region and continue to one or more internal components of the electronic device. This may cause may damage to the electronic device, including the one or more internal components.

SUMMARY

In one aspect, an electronic device is described. The electronic device may include an enclosure that defines an internal cavity. The electronic device may further include a protective cover separated from the enclosure by an opening. The electronic device may further include a sealing element secured with the protective cover and the enclosure to prevent a material from entering the internal cavity via the opening. The sealing element may include a force detection sensor that monitors a force applied to the protective cover.

In another aspect, an electronic device having a first part and a second part is described. The electronic device may include a sealing element secured between the first part and the second part to provide a barrier from a material entering an opening between the first part and the second part. The sealing element may include an aperture. The electronic device may further include a restraining element disposed in the aperture to prevent the material from moving the sealing element when the sealing element is engaged with the restraining element.

In another aspect, a method for forming an electronic device having an enclosure defining an internal cavity and a protective cover separated from the enclosure by an opening is described. The method may include securing the protective cover with the enclosure by a sealing element configured to prevent a material from entering the internal cavity via the opening. The sealing element may include a force detection sensor that monitors a force applied to the protective cover. The method may further include forming a support member around the sealing element that protects the sealing element from the material.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The described embodiments relate to an electronic device having retention features designed to maintain a sealing element in a desired location while also providing support to the sealing element. The sealing can be used to provide a seal against ingress into the electronic device. In some embodiments, the sealing element is secured with a protective cover (such as a cover glass of the electronic device) and an enclosure of the electronic device. In this regard, the sealing element is positioned to limit or prevent ingress through a location between the sealing the protective cover and the enclosure.

In addition, the sealing element may include several components that combine to form a force detection sensor designed to detect or monitor an amount of force applied to the protective cover. For example, the sealing element may include a compressible dielectric material positioned between a pair of flexible circuits, with one of the flexible circuits carrying an electric charge such that the sealing element includes a capacitance, or capacitance value. In this regard, the sealing element may take the form of a parallel plate capacitor using the flexible circuit as plates. In response to a force, the compressible dielectric material may compress, causing the distance between the plates to decrease, and in turn, causes the capacitance of the sealing element to change. The force may occur by a user depressing the protective cover, which transmits at least some force to the compressible dielectric material. Also, the change in distance is proportional to the change in capacitance. Accordingly, the capacitance may correspond to an amount of force applied to the cover glass.

In some cases, liquid ingress may enter an opening between the cover glass and the enclosure. For example, when the electronic device is exposed to water, the water may enter the opening and exert a force on the sealing element. The water may continue to exert a static force on the sealing element until it leaves the opening, or until the water evaporates.

However, the electronic device may include several enhancements designed to counteract forces applied to the sealing element. For example, the electronic device may include one or more support members that combine to surround the sealing element. The support members may act as a buffer between an external force (such as water, in the prior example) and the sealing element. Alternatively, or in combination, the electronic device may include a blocking element at or near an edge of the enclosure. The blocking element may be positioned in a location that allows the sealing element (and/or the support members) to abut or engage the blocking element in the event that the external force causes the sealing element to move in a direction toward and engage the blocking element. Also, the blocking element may be inserted into the electronic device as a separate feature. Alternatively, the blocking element may include an operational component, such as a circuit or an antenna, already disposed in the electronic device and positioned in a location to provide a support or counterforce to the sealing element.

In some cases, the protective cover may include a notch designed to receive a portion of the blocking element. In this manner, when a force is applied to the protective cover causing the protective cover to move, the notch may receive a portion of the blocking element. Further, if the force is sufficient, the protective cover may engage the blocking element. However, the blocking element may provide a counterforce to the protective cover in order to limit additional movement of the protective cover.

Alternatively, or in combination, the sealing element may include several openings (or apertures), with each opening designed to receive a restraining element, such as a pin. When the restraining elements are positioned in their respective openings, the restraining element may provide support to the sealing element by counteracting lateral or shear forces to the sealing element caused by, for example, a liquid entering an opening between the protective cover and the enclosure. Also, the enclosure may include several grooves, each of which may be designed to receive a portion of a restraining element. When disposed in the groove, the restraining element may above a sidewall of the groove, and accordingly, the enclosure may provide the restraining member with an additional counterforce against forces acting the sealing element.

These and other embodiments are discussed below with reference to FIGS. 1-17. However, those skilled in the art will readily appreciate that the detailed description given herein with respect to these Figures is for explanatory purposes only and should not be construed as limiting.

Figure 1:
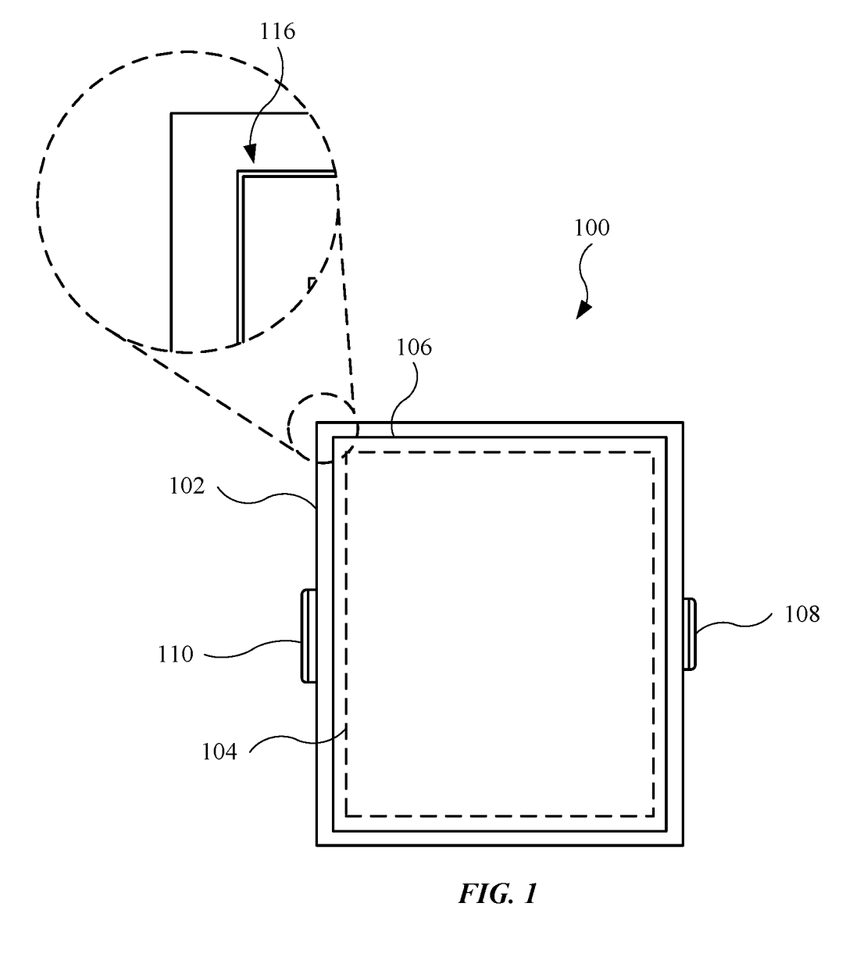
FIG. 1 illustrates a plan view of an embodiment of an electronic device, in accordance with the described embodiments.

FIG. 1 illustrates a plan view of an embodiment of an electronic device 100, in accordance with the described embodiments. In some embodiments, the electronic device 100 is a tablet device. In other embodiments, the electronic device 100 is a mobile wireless communication device, such as a smartphone. Still, in other embodiments, the electronic device 100 is a wearable electronic device, similar to a watch. When the electronic device 100 is a wearable electronic device, the electronic device 100 may include one or more bands (not shown) designed to wrap around an appendage (a wrist, for example) of a user.

As shown, the electronic device 100 may include an enclosure 102. In some embodiments, the enclosure 102 is formed from a metal, which may include aluminum, stainless steel, ceramic, as non-limiting examples. In other embodiments, the enclosure 102 includes a metal alloy. The electronic device 100 may further include a display assembly 104 (shown as a dotted line) designed to present visual information. The display assembly 104 may include a touch-sensitive display assembly designed to respond to a capacitive coupling with the display assembly 104. The electronic device 100 may further include a protective cover 106 that overlays the display assembly 104. The protective cover 106 may include a material, such as glass or sapphire, that provides a transparent protective layer for the display assembly 104.

Also, the electronic device 100 may include one or more input features, such as a first input feature 108 and a second input feature 110. The first input feature 108 and/or the second input feature 110 may include a dial designed to rotate and provide an input to the electronic device 100 by rotation. Alternatively, the first input feature 108 and/or the second input feature 110 may include a button designed to depress in a direction toward the enclosure 102 in response to a force and provide an input to the electronic device 100 by the depression. The first input feature 108 and/or the second input feature 110 may be used to generate an input or command to a processor circuit (not shown) in the electronic device 100. In response to the input or command, the processor circuit may use an executable program stored on a memory circuit (not shown) to change the visual information displayed on the display assembly 104. Also, the electronic device 100 may include one or more radio circuits (not shown) that provide the electronic device 100 with wireless communication capabilities to, such as Bluetooth or 802.11 (Wi-Fi) protocol, connect to a network as well as pair with an additional electronic device.

Also, as shown in the enlarged view, the enclosure 102 and the protective cover 106 are separated by an opening 116 at an interface region between the enclosure 102 and the protective cover 106. In some cases, when the electronic device 100 is exposed to a liquid, the liquid may enter through the opening 116. However, the electronic device 100 may include a sealing element designed to prevent further ingress of the liquid through the electronic device 100. This will be shown and described below.

Figure 2:
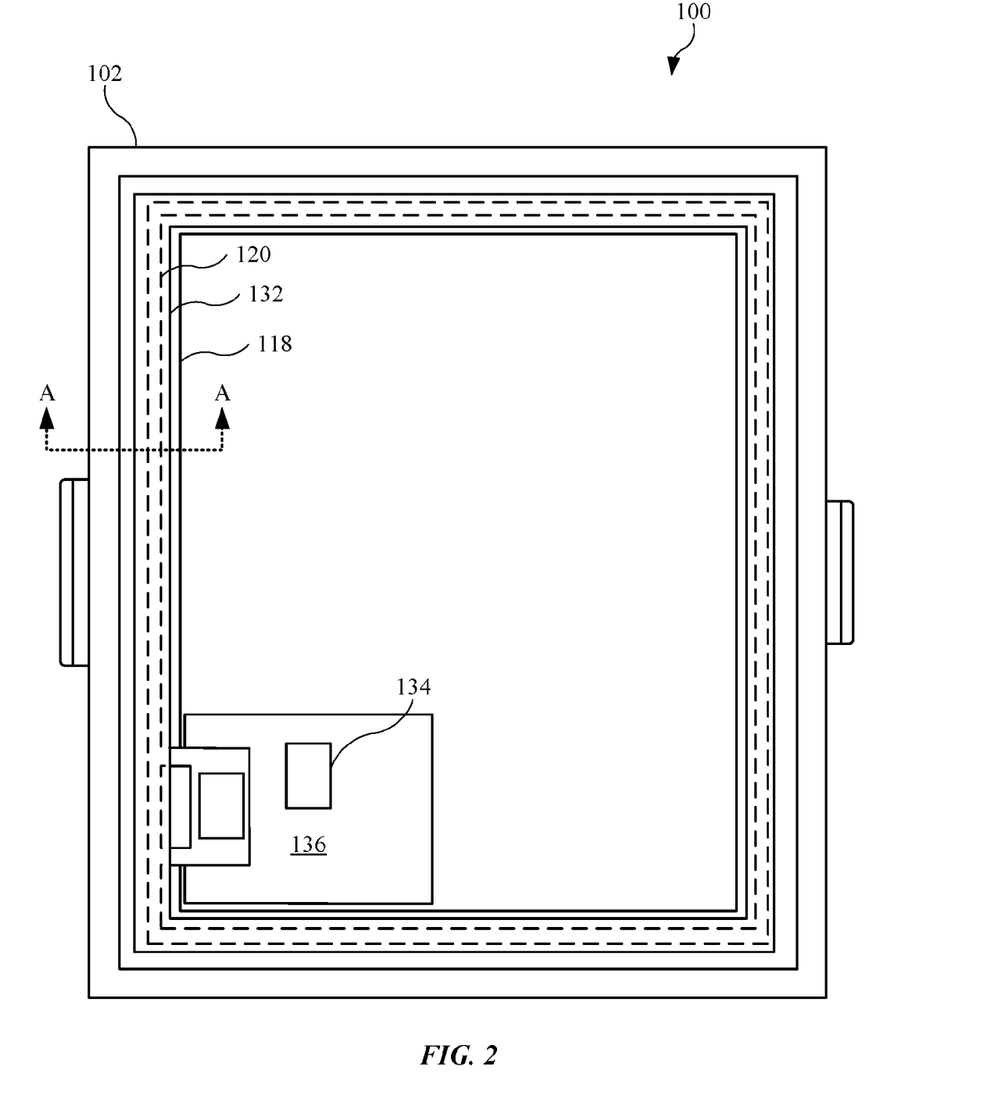
FIG. 2 illustrates a plan view of the electronic device shown in FIG. 1, showing several internal components of the electronic device.

FIG. 2 illustrates a plan view of the electronic device 100 shown in FIG. 1, showing several internal components of the electronic device 100. For purposes of simplicity and illustration, the display assembly 104 and protective cover 106 (both shown in FIG. 1) as well as several internal features, such as a processor circuit, memory circuit, and battery, are removed. As shown, the enclosure 102 includes a platform 118. The platform 118 may include a generally flat surface designed to carry a sealing element 120 (shown as a dotted line) positioned along, and adhesively secured with, the platform 118. When the protective cover 106 is secured with the enclosure 102, the sealing element 120 provides designed to provide a seal, in a manner similar to a gasket, against ingress of liquids or contaminants that may pass through the opening 116 (shown in FIG. 1). In some embodiments, the sealing element 120 is covered by one or more support members designed to protect the sealing element. For example, the electronic device 100 may include a first support member 132 and a second support member (not shown) that combine to surround the sealing element 120. It should be noted that the first support member 132 and the second support member can be secured (for example, adhesively secured) with the protective cover 106 and the platform 118, respectively. Also, in addition to providing an ingress barrier, the sealing element 120 may also serve as a force detection sensor designed to detect an amount of force applied to the protective cover 106 (shown in FIG. 1). The sealing element 120 may include a pair of flexible circuits (not shown) that combine to form a parallel plate capacitor separated by an electrically nonconductive dielectric material (not shown), such as silicon. In this regard, the flexible circuits may be electrically coupled with an integrated circuit 134 (disposed on a circuit board 136) such that one of the flexible circuits stores electrical charge, creating a voltage difference between the flexible circuits. This will be further described below.

Figure 3:
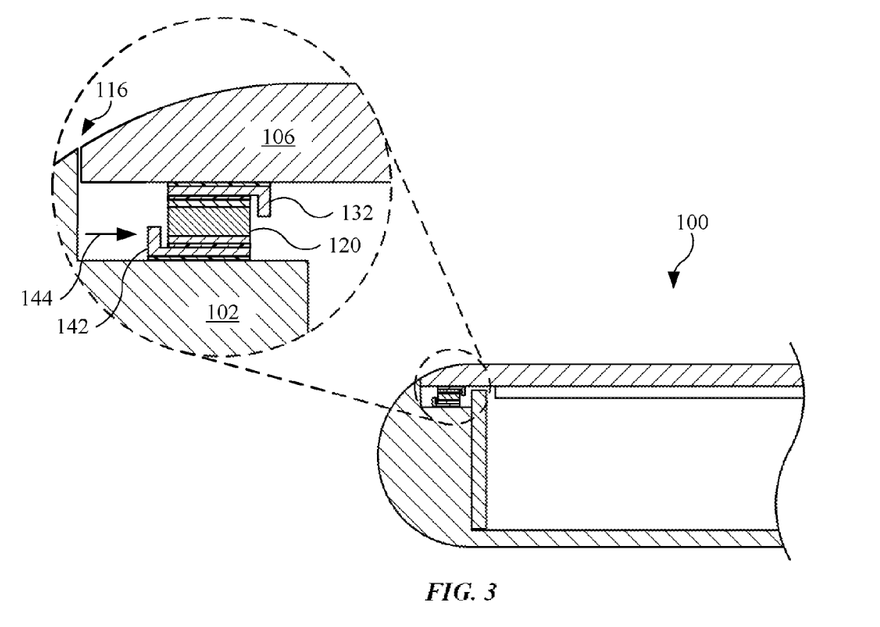
FIG. 3 illustrates a cross sectional view of the electronic device shown in FIG. 2, taken along line A-A.

FIG. 3 illustrates a cross sectional view of the electronic device 100 shown in FIG. 2, taken along line A-A. As shown in the enlarged view, the sealing element 120 is positioned between the enclosure 102 and the protective cover 106, and accordingly, is positioned to receive a force to the protective cover 106. Also, the sealing element 120 can be surrounded, or at least partially surrounded, by the first support member 132 and a second support member 142. The first support member 132 and the second support member 142 may be formed from a relatively rigid material, or materials, that require a greater amount of force to compress or deform, as compared to the sealing element 120. In this regard, the support members may combine to add stiffness and structural rigidity to the sealing element 120, as well as shield the sealing element 120 from ingress materials that may pass through the opening 116.

In order to create a physical barrier from a force (or forces) exerted by an ingress fluid, the first support member 132 and the second support member 142 may include a style or configuration that resembles an L-bracket (in a cross sectional view of the support members). In this regard, the second support member 142 is positioned to form a barrier from a force (in the direction of an arrow 144) from a liquid or other compound that would otherwise cause a shear force or shear stress to the sealing element 120. As a result, the sealing element 120 is better suited to resist static forces from liquids entering through the opening 116. Moreover, in the event the ingress causes the sealing element 120 to move, the first support member 132 is positioned to limit or prevent further movement.

Figure 4:
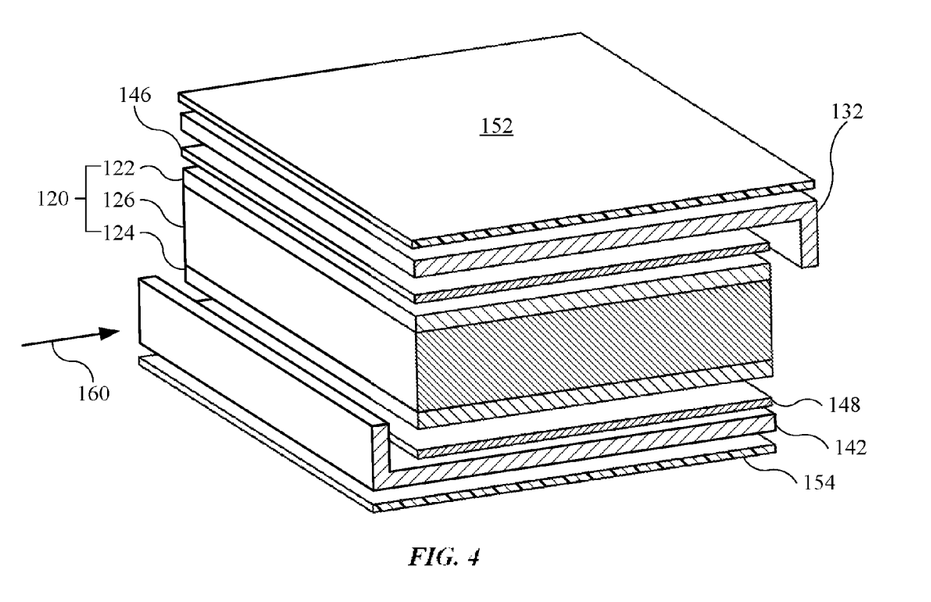
FIG. 4 illustrates a partial cross sectional view of an enlarged portion of the sealing element shown in FIG. 3, further showing various components surrounding the sealing element.

FIG. 4 illustrates a partial cross sectional view of an enlarged portion of the sealing element 120 shown in FIG. 3, further showing various components surrounding the sealing element 120. As shown, the sealing element 120 may include a first flexible circuit 122 and a second flexible circuit 124, with the first flexible circuit 122 and the second flexible circuit 124 combining to surround a central layer 126. In some embodiments, the central layer 126 includes a non-electrically conductive dielectric material, such as silicon. However, the central layer 126 may include other nonconductive materials. In addition, the central layer 126 may include compressible properties that allow the central layer 126 to compress in response receiving a force. For example, a force exerted on the protective cover 106 (shown in FIG. 3) may be transmitted in part to the central layer 126, causes the central layer 126 to compress. Also, the first flexible circuit 122 and the second flexible circuit 124 may secure with the central layer 126 by an adhesive (not shown).

In some embodiments, the sealing element 120 uses the first flexible circuit 122 and the second flexible circuit 124 to form a parallel plate capacitor separated by a distance defined by the central layer 126. In this regard, the first flexible circuit 122 may store electrical charge, creating a voltage difference between the first flexible circuit 122 and the second flexible circuit 124. The measure of capacitance, or capacitance value, of the sealing element 120 is inversely proportional to the distance between flexible circuits. Accordingly, a compression of the central layer 126 may change the capacitance of the sealing element 120. In some embodiments, a force to the protective cover 106 causes the central layer 126 to compress, which causes 1) the distance between the flexible circuits to decrease, and 2) the capacitance of the sealing element 120 to increase. Also, the desired capacitance of the parallel plate capacitor (formed by the sealing element 120) can be modified according to the permittivity of the central layer 126. It should be noted that the components and features of the sealing element 120 may extend along the platform 118 (shown in FIG. 2) in a manner similar to that of the sealing element 120.

The sealing element 120 (and in particular, the flexible circuits) may be secured with the first support member 132 and the second support member 142 by first adhesive layer 146 and a second adhesive layer 148, respectively. In some embodiments, the first adhesive layer 146 and the second adhesive layer 148 include a first type adhesive, which may include a temperature sensitive adhesive ("TSA"). Also, the first support member 132 may be adhesively secured with the protective cover 106 (shown in FIG. 3) by a third adhesive layer 152, and the second support member 142 may be adhesively secured with the platform 118 (shown in FIG. 2) by a fourth adhesive layer 154. In some embodiments, the third adhesive layer 152 and the fourth adhesive layer 154 include a second type adhesive, which may include a pressure sensitive adhesive ("PSA"). The second type adhesive may facilitate an assembly operation that includes adhesively securing the support members to their respective components. Generally, the first type adhesive provides a relatively stronger bond than that of the second type adhesive, allowing for a stronger bond between the sealing element 120 and the support members to further resist forces in a direction of an arrow 160. However, in some embodiments, the first type adhesive and the second type adhesive are interchanged. In other embodiments, only one of the first type adhesive and the second type adhesive is used.

Figure 5:
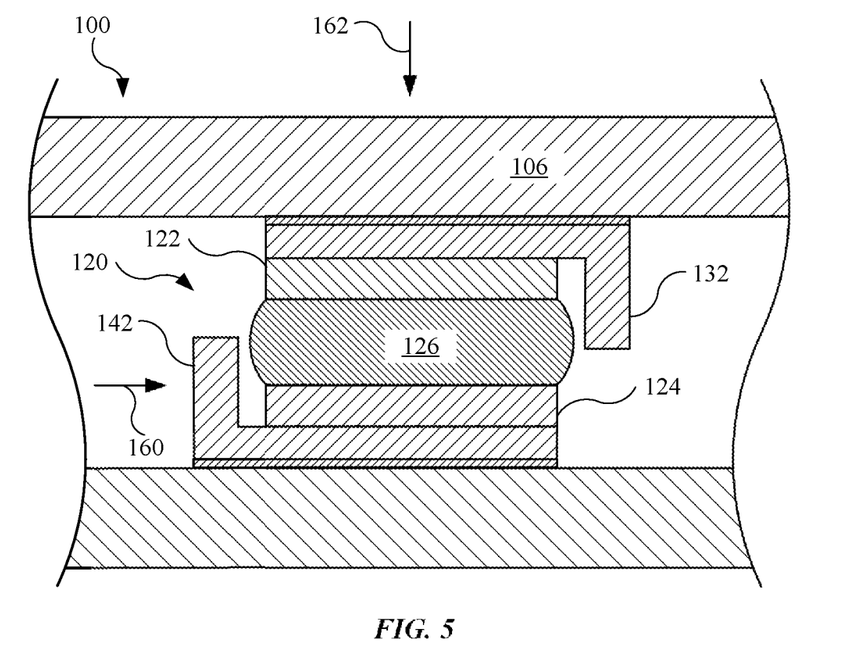
FIG. 5 illustrates an enlarged cross sectional view of the electronic device shown in FIG. 1, showing the sealing element respond to a force to the protective cover and also showing the support members providing protection to the sealing element.

FIG. 5 illustrates an enlarged cross sectional view of the electronic device 100 shown in FIG. 1, showing the sealing element 120 respond to a force (denoted by a second arrow 162) to the protective cover 106 and also showing the support members providing protection to the sealing element 120. Even during compression of the sealing element 120 (and in particular, the central layer 126), the second support member 142 may shield the sealing element 120 from forces in the direction of the arrow 160. However, when an external force in a direction of the second arrow 162 is exerted on the protective cover 106, the first support member 132 is positioned to absorb at least some of the external force. It should be noted that the sensing electronics are tuned and adjusted for any such force absorption by the first support member 132. Also, as shown, the first flexible circuit 122, based on the force in the direction of the second arrow 162, moves in a direction toward the second flexible circuit 124, thereby reducing the distance between the first flexible circuit 122 and the second flexible circuit 124, and changing the capacitance output of the sealing element 120.

Figure 6:
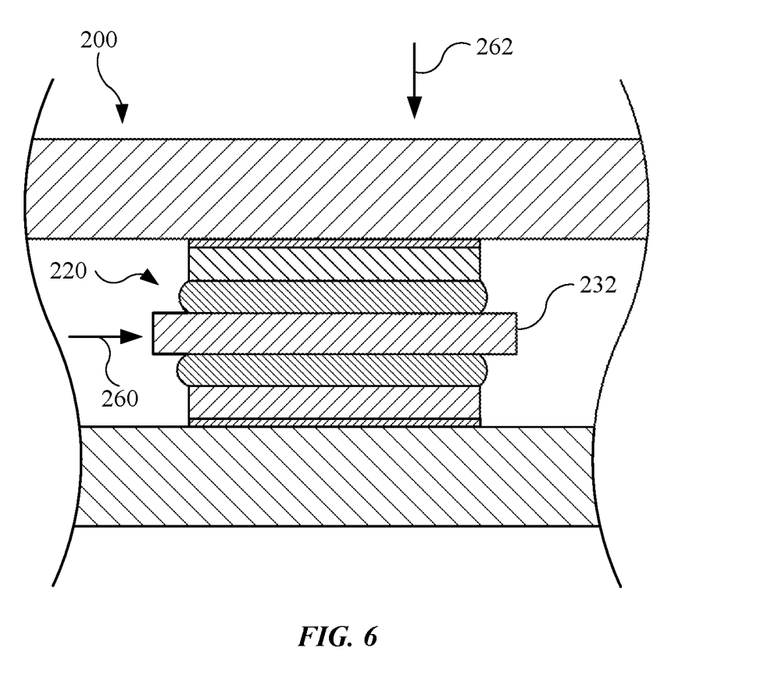
FIG. 6 illustrates an enlarged cross sectional view of an alternative embodiment of an electronic device having a sealing element and a support member extending through the sealing element, in accordance with the described embodiments.

FIG. 6 illustrates an enlarged cross sectional view of an alternative embodiment of an electronic device 200 having a sealing element 220 and a support member 232 extending through the sealing element 220, in accordance with the described embodiments. With the support member 232 embedded in the sealing element 220, the overall structural rigidity of the sealing element 220 may increase. As shown, the support member 232 may provide support against forces in a first direction (denoted by a first arrow 260) and also in a second direction (denoted by a second arrow 262). In these embodiments, the support member 232 should be made from an electrically nonconductive material, such as plastic. By using a single structural component (the support member 232), the electronic device 200 uses fewer materials and fewer parts. Also, the sealing element 220 may include any material(s) or feature(s) previously described for a sealing element.

Figure 7:
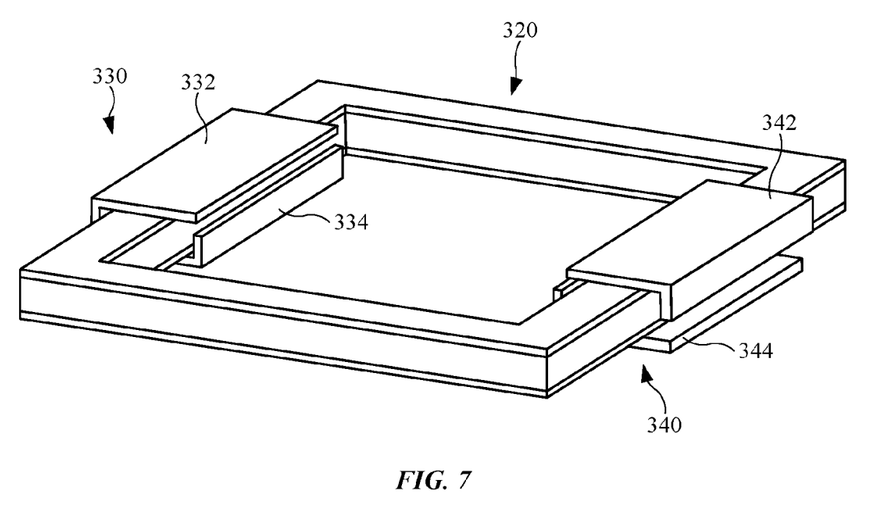
FIG. 7 illustrates an isometric view of an embodiment a sealing element surrounded by support members in preselected locations, in accordance with the described embodiments.

FIG. 7 illustrates an isometric view of an embodiment a sealing element 320 surrounded by support members in preselected locations, in accordance with the described embodiments. The sealing element 320 may include any feature or features previously described for a sealing element. As shown, a first support assembly 330 and a second support assembly 340 may surround selected regions of the sealing element 320. The first support assembly 330 and the second support assembly 340 may include supporting elements having a style or configuration that resembles an L-bracket, similar to previous embodiments. For example, the first support assembly 330 may include a first support member 332 and a second support member 334, and the second support assembly 340 may include a first support member 342 and a second support member 344, with the aforementioned support members having an L-shaped configuration to at least partially surround the sealing element 320. As shown, the first support assembly 330 and the second support assembly 340 cover selected locations of the sealing element 320, which may correspond to locations of the sealing element 320 more susceptible to damage by external forces. By using less materials, the structural components defining the first support assembly 330 and the second support assembly 340 may result in less cost and less occupied space (by the support members).

Figure 8:
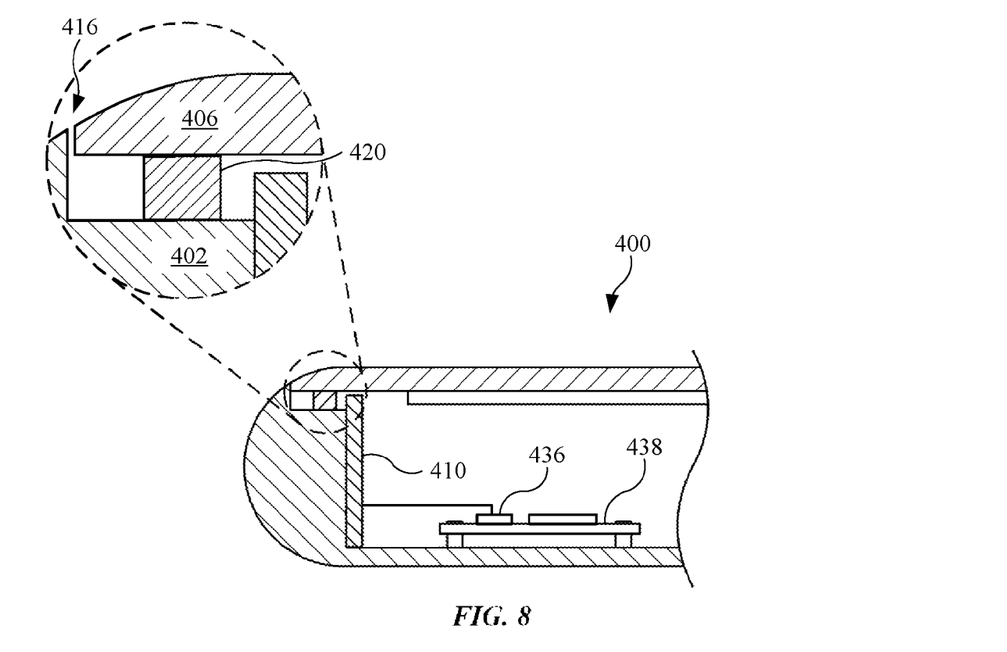
FIG. 8 illustrates a cross sectional view of an electronic device having a blocking element designed to provide a counterforce to an external force acting on a sealing element, in accordance with the described embodiments.

FIG. 8 illustrates a cross sectional view of an electronic device 400 having a blocking element 410 designed to provide a counterforce to a force acting on a sealing element 420. As shown, the sealing element 420 may secure with an enclosure 402 and a protective cover 406 of the electronic device 400. The sealing element 420 may include any feature or features previously described for a sealing element. However, in the embodiment shown in FIG. 8, the sealing element 420 includes a gasket formed from rubber or adhesive (including PSA), and is designed to provide a seal or barrier against ingress entering through an opening 416 between the enclosure 402 and the protective cover 406.

In the event a force or forces sufficient to displace the sealing element 420, the sealing element 420 may break some adhesive bonds (for example, between the protective cover 406 and/or the enclosure 402), and engage the blocking element 410. In this regard, the blocking element 410 may provide the sealing element 420 with counterforce against the forces that displace the sealing element 420, causing the sealing element 420 to refrain from further movement and remain against the blocking element 410 to continue providing an ingress barrier. In some embodiments, the blocking element 410 is a bracket installed in the electronic device 400, with the sole purpose of preventing additional movement by allowing the sealing element 420 to abut and engage the blocking element 410. In the embodiment shown in FIG. 8, the blocking element 410 is an operational component, such as a circuit or an antenna. As shown, the blocking element 410 is electrically coupled with an integrated circuit 436 on a circuit board 438 in the electronic device 400 such that the blocking element 410 is in electrical communication with the integrated circuit 436 and circuit board 438. In this regard, the blocking element 410 may include an antenna suitable for wireless communication provided by the integrated circuit 436. The blocking element 410 may further include an insulating material, or other non-electrically conductive material, in some locations to prevent unwanted electrical discharge. In this manner, the blocking element 410 may include an already-existing component in the electronic device 400 used to provide multiple functions, and the electronic device 400 may require fewer parts.

Figure 9:
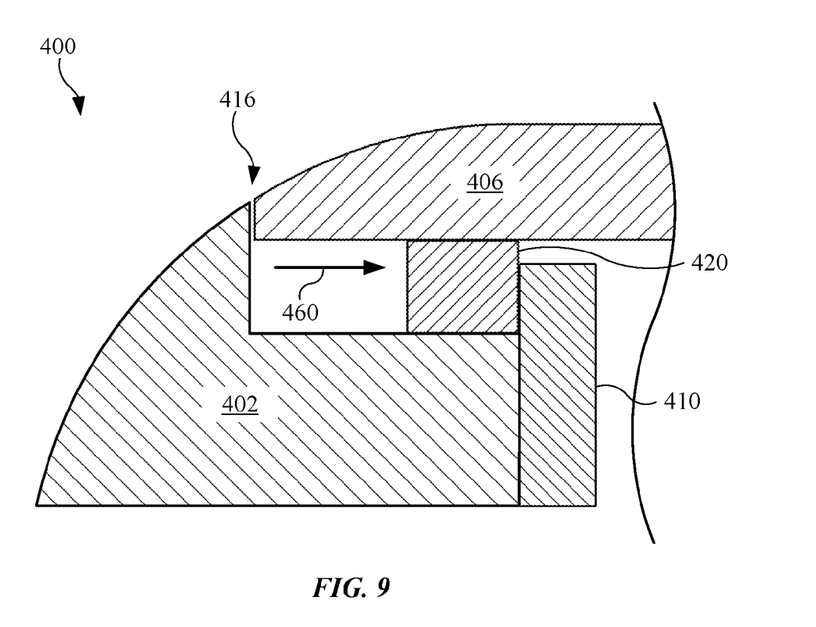
FIG. 9 illustrates a cross sectional view of the electronic device shown in FIG. 8, with the sealing element displaced by the external force and engaged with the blocking element.

FIG. 9 illustrates a cross sectional view of the electronic device 400 shown in FIG. 8, with the sealing element 420 displaced by the external force (in a direction denoted by an arrow 460) and engaged with the blocking element 410. As shown, the blocking element 410 may limit or prevent additional movement of the sealing element 420 and maintain the sealing element 420 on a platform of the enclosure 402, as shown in FIG. 9, as the blocking element 410 is designed to withstand relatively higher forces than those caused by a liquid exerted on the sealing element 420. In this manner, the sealing element 420 may continue to provide a seal between the enclosure 402 and the protective cover 406. Also, in embodiments where the sealing element 420 includes a parallel plate capacitor designed to detect an amount of force exerted on the protective cover 406, the sealing element 420 may still be positioned to do so.

Figure 10:
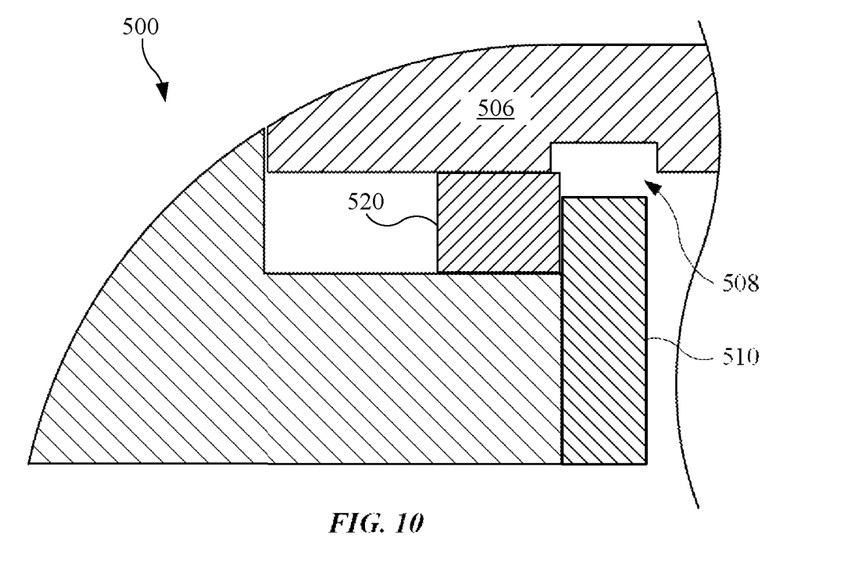
FIG. 10 illustrates a cross sectional view of an alternative embodiment of an electronic device, showing a protective cover having a notch designed to receive a blocking element, in accordance with the described embodiments.

FIG. 10 illustrates a cross sectional view of an alternative embodiment of an electronic device 500, showing a protective cover 506 having a notch 508 designed to receive a blocking element 510, in accordance with the described embodiments. Accordingly, the notch 508 may include a size and a shape to receive at least a portion of the blocking element 510. A sealing element 520 may include any feature or features previously described for a sealing element.

Figure 11:
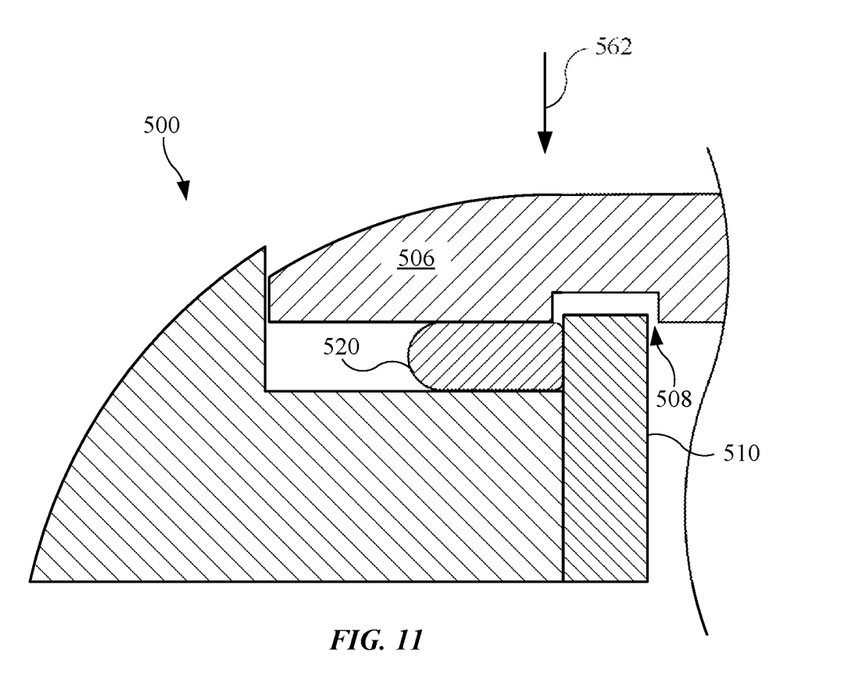
FIG. 11 illustrates a cross sectional view of the electronic device shown in FIG. 10, further showing a force acting on the electronic device.

FIG. 11 illustrates a cross sectional view of the electronic device 500 shown in FIG. 10, further showing a force acting on the electronic device 500. For example, a force in a direction of an arrow 562 exerted on the protective cover 506 may cause the protective cover 506 to move in a direction toward the blocking element 510. However, the notch 508 is sized and positioned to prevent the protective cover 506 from contacting the blocking element 510. This may avoid damage to the protective cover 506 and/or the blocking element 510. However, in other embodiments, the notch 508 may include a size and a shape such that the protective cover 506, in response to the force, may engage the blocking element 510 and prevent an unwanted "over travel" of the protective cover 506. Also, when the sealing element 520 includes components to form a force detection sensor based on a capacitance change of the sealing element 520, a control circuit (not shown), or some other integrated circuit, may be tuned to detect the capacitance change based upon a predetermined maximum force that is less than or equal to a force applied to the protective cover 506 that causes the protective cover 506 to engage the blocking element 510. In this regard, the blocking element 510 and the notch 508 can be integrated with the sealing element 520 without prevent force detection sensing.

Figure 12:
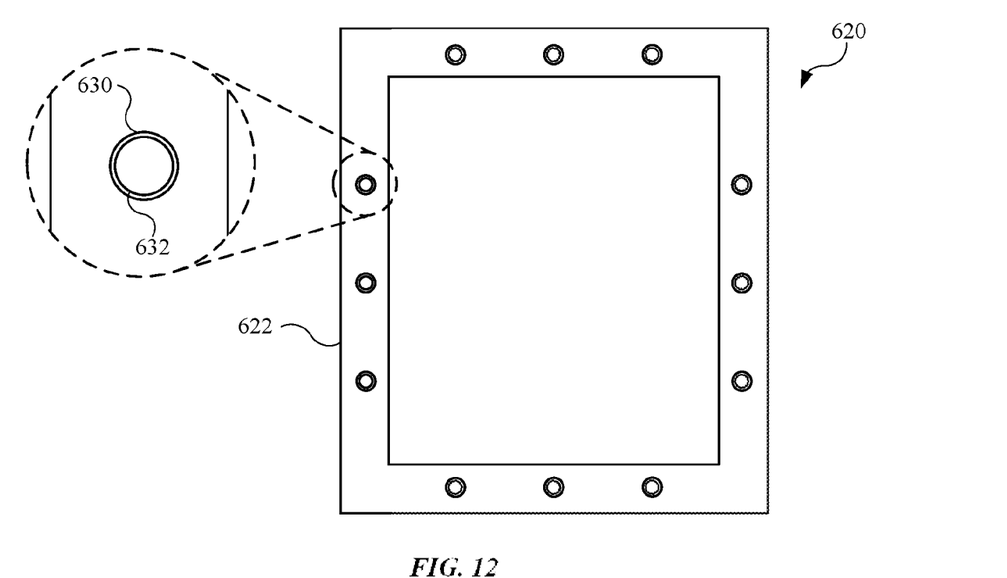
FIG. 12 illustrates a plan view of an embodiment of a sealing element having several openings, with each of the openings having a restraining element disposed therein.

An electronic device may include a sealing element having other features to prevent unwanted movement of the sealing element. For example, FIG. 12 illustrates a plan view of an embodiment of a sealing element 620 having several openings, with each of the openings having a restraining element disposed therein. The sealing element 620 may include any feature or features previously described for a sealing element. The restraining element may include a pin designed to fit into an opening of the sealing element 620. For example, the sealing element 620 may include a first opening 630 that receives a first restraining element 632, with the first opening 630 and the first restraining element 632 representative of the remaining openings and restraining elements, respectively. The restraining elements may be made from a polymeric material, such as plastic. However, the restraining elements may be made from a metal so long as the flexible circuits (such as a first flexible circuit 622) are not electrically coupled with the restraining elements. The restraining elements may combine to provide a counterforce to external forces acting on the sealing element 620. This will be shown below. Also, although a discrete number of openings and restraining elements are shown, the number of openings and restraining elements of the sealing element 620 may vary according to an amount of required counterforce.

Figure 13:
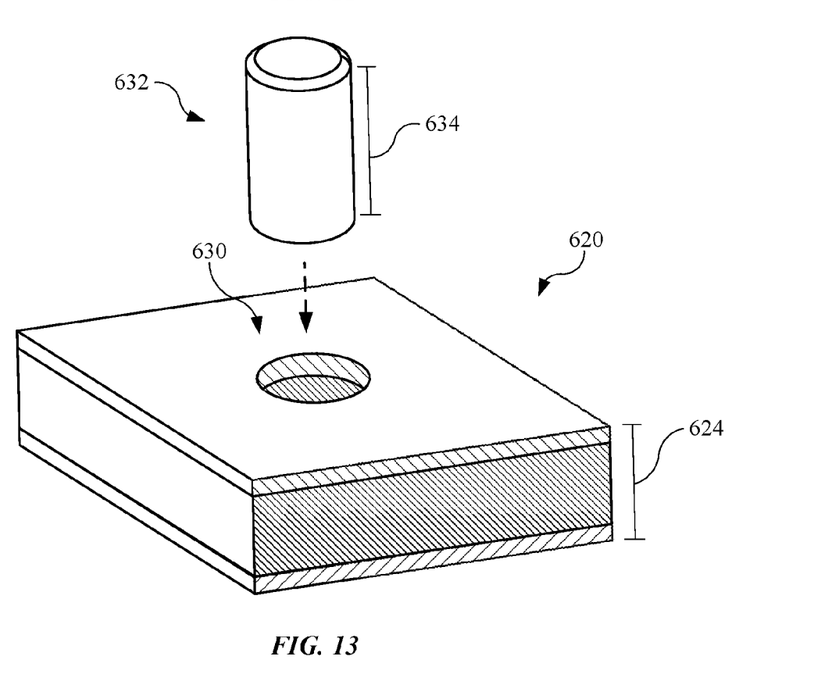
FIG. 13 illustrates a partial cross sectional view of the sealing element shown in FIG. 12, showing the first restraining element prior to inserting the first restraining element into the first opening.

FIG. 13 illustrates a partial cross sectional view of the sealing element 620 shown in FIG. 12, showing the first restraining element 632 prior to inserting the first restraining element 632 into the first opening 630. The first opening 630 of the sealing element 620 may extend through all layers of the sealing element 620. Also, in some embodiments, the first restraining element 632 includes a dimension 634, shown as a length, substantially similar to a dimension 624, also shown as a length, of the sealing element 620. However, in other embodiments, the first restraining element 632 includes a dimension 634 greater than that of a dimension 624 of the sealing element 620.

Figure 14:
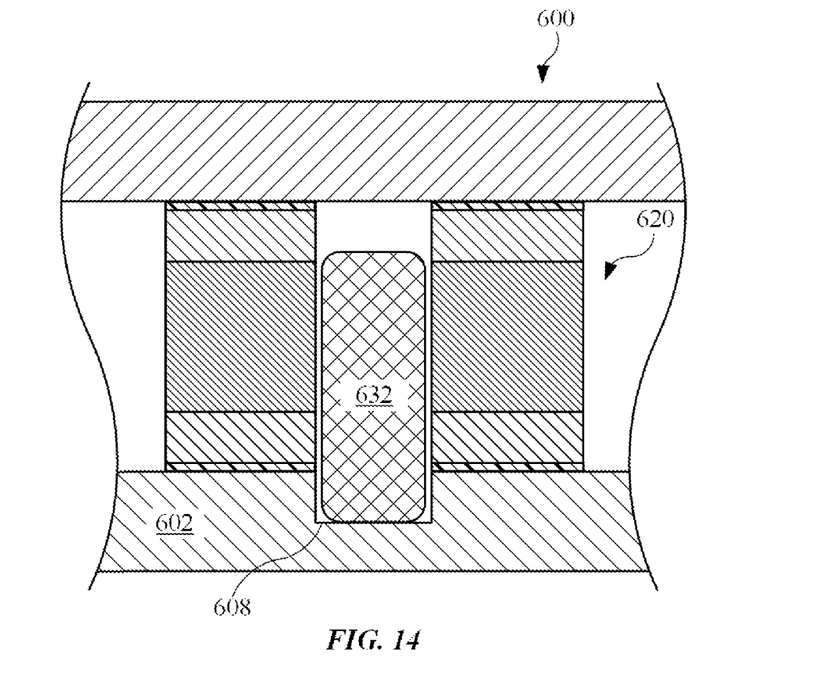
FIG. 14 illustrates an enlarged cross sectional view of an electronic device that includes the sealing element shown in FIG. 13, further showing the sealing element disposed on an enclosure of the electronic device and also showing the first restraining element in the first opening of the sealing element, in accordance with the described embodiments.

FIG. 14 illustrates an enlarged cross sectional view of an electronic device 600 that includes the sealing element 620 shown in FIG. 13, further showing the sealing element 620 disposed on an enclosure 602 of the electronic device 600 and also showing the first restraining element 632 in the first opening 630 of the sealing element 620, in accordance with the described embodiments. As shown, the enclosure 602 includes a cavity 608, or groove, representing a partial opening in the enclosure 602 to receive a portion of the first restraining element 632. Accordingly, the cavity 608 may include a size and a shape suitable to receive a portion of the first restraining element 632.

Figure 15:
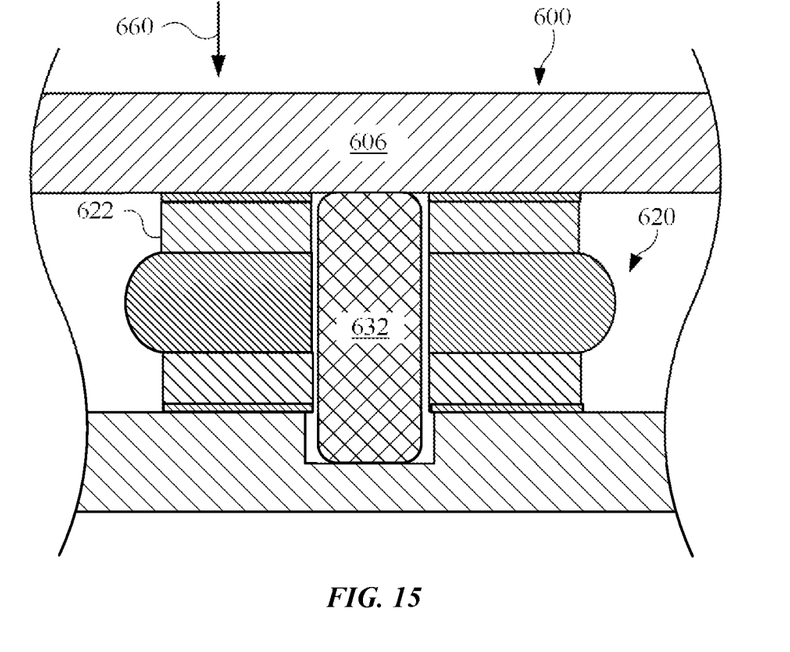
FIG. 15 illustrates an enlarged cross sectional view of the electronic device shown in FIG. 14, with a force applied to a protective cover of the electronic device.

FIG. 15 illustrates an enlarged cross sectional view of the electronic device 600 shown in FIG. 14, with a force applied to a protective cover 606 of the electronic device 600. As shown, the force is applied in a direction of an arrow 660, causing the protective cover 606 and the first flexible circuit 622 to move. However, as shown in FIG. 15, the first restraining element 632, in conjunction with other similar restraining elements (not shown), may engage the protective cover 606 and provide a counterforce to limit or prevent additional movement of the sealing element 620 and the protective cover 606.

Figure 16:
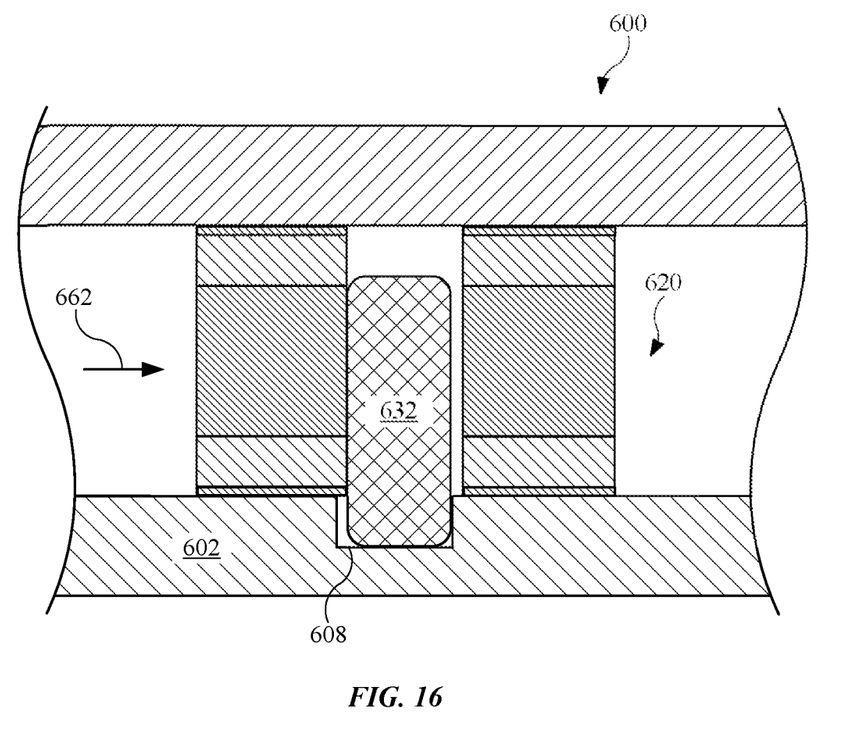
FIG. 16 illustrates the electronic device shown in FIG. 14, with a force applied to the sealing element.

With the first restraining element 632 positioned partially in the cavity 608, the first restraining element 632 may abut or engage the enclosure 602, and use the enclosure 602 to provide an increased counterforce against lateral forces or shear forces. For example, FIG. 16 illustrates the electronic device 600 shown in FIG. 14, with a force applied to the sealing element 620. The force, in a direction of an arrow

662, may include a shear force exerted laterally with respect to the sealing element 620. The force may cause some displacement of the sealing element 620. However, in response to the displacement of the sealing element 620, the first restraining element 632, partially disposed in the cavity 608, may engage the enclosure 602 and provide a counter-force to prevent further movement of the sealing element 620. Accordingly, the first restraining element 632, in conjunction with other similar restraining elements (not shown), may combine with the enclosure 602 to provide a force that counters a shearing force (in the direction of the arrow 662) to the sealing element 620.

Figure 17:
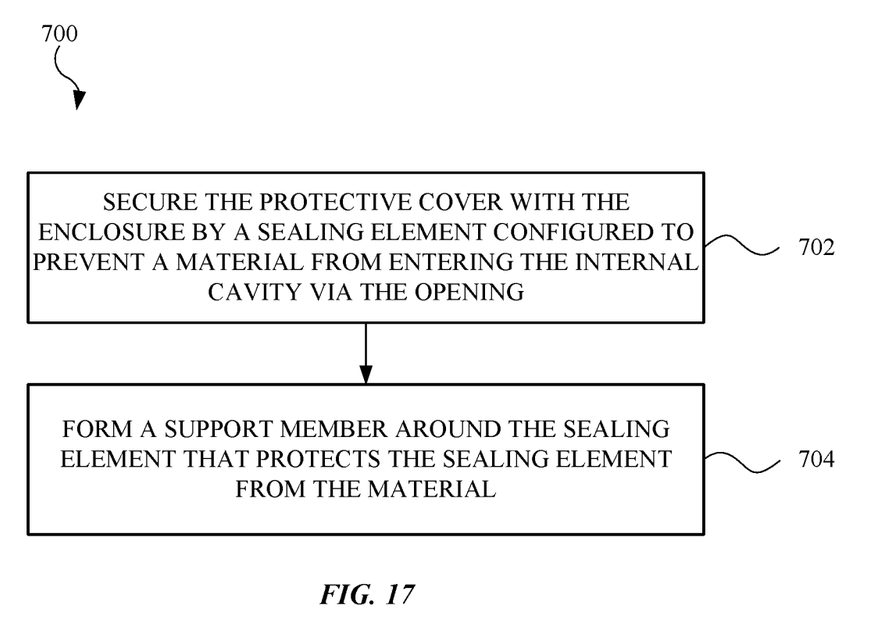
FIG. 17 illustrates a flowchart showing a method for forming an electronic device having an enclosure defining an internal cavity and a protective cover separated from the enclosure by an opening, in accordance with the described embodiments.

FIG. 17 illustrates a flowchart 700 showing a method for forming an electronic device having an enclosure defining an internal cavity and a protective cover separated from the enclosure by an opening, in accordance with the described embodiments. In step 702, the protective cover is secured with the enclosure by a sealing element configured to prevent a material from entering the internal cavity via the opening. The sealing element can include a force detection sensor that monitors or detects a force applied to the protective cover.

In some embodiments, the sealing element includes a pair of flexible circuits, one of which stores electrical charge that creates a voltage difference between the two flexible circuits. Also, the flexible circuits are separated by a dielectric central layer designed to compress in response to a force to the protective cover. In this regard, the sealing element may include a capacitance, or capacitance value, when the dielectric central layer is in an uncompressed stated, and may change in capacitance in response to the force to the protective cover that compresses the dielectric central layer. The compression of the dielectric central layer may cause the voltage difference between the flexible circuits to change, thereby causing the capacitance to change. Accordingly, the sealing element may monitor or detect the force applied to the protective cover by changing the capacitance, or capacitance value.

In step 704, a support member is formed around the sealing element that protects the sealing element from the material. The support member may include an L-shaped configuration to at least partially overhang the sealing element such that the support member is positioned between the material (entering the opening) and the sealing element, thereby providing a physical barrier against the material. Also, additional support members are possible.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable electronic device, comprising:
   an enclosure that defines an internal cavity;
   a display assembly that includes touch sensitive components;
   a transparent protective cover that overlays the display assembly and couples with the enclosure, the protective cover separated from the enclosure by a gap;
   a sealing element secured with the transparent protective cover and the enclosure to prevent liquid ingress from entering the internal cavity via the gap, the sealing element comprising a force detection sensor configured to detect a force applied to the transparent protective cover; and
   support members that at least partially surround the sealing element to shield the sealing element from the liquid ingress.

2. The wearable electronic device of claim 1, wherein the support members comprise:
   a first support member positioned between the transparent protective cover and the sealing element; and
   a second support member positioned between the sealing element and the enclosure wherein each of the first support member and the second support member includes a first portion and a second portion perpendicular to the first portion, wherein the second portion of the second support member is at least partially positioned between the gap and the sealing element.

3. The wearable electronic device of claim 1, wherein the force detection sensor comprises:
   a first flexible circuit configured to store electrical charge;
   a second flexible circuit: and
   a central layer between the first flexible circuit and the second flexible circuit, wherein in response to the force to the transparent protective cover causes the central layer compresses thereby causing the electrical charge to change.

4. The wearable electronic device of claim 1, wherein the force detection sensor comprises a parallel plate capacitor that changes a capacitance in response to the force applied to the protective cover.

5. The wearable electronic device of claim 1, further comprising a blocking element positioned in the internal cavity such that in response to movement of the sealing element to engage the blocking element, the blocking element prevents ceases the movement of the sealing element.

6. The wearable electronic device of claim 5, wherein the blocking element comprises an operational component that includes at least an antenna or a circuit.

7. The wearable electronic device of claim 5, wherein the protective cover comprises a notch configured to receive the blocking element a force to the protective cover actuates the protective cover in a direction toward the enclosure.

8. The wearable electronic device of claim 1, wherein the transparent protective cover comprises glass or sapphire.

9. An electronic device, comprising:
   an enclosure that includes a platform and an internal cavity surrounded by the platform;
   a transparent protective cover coupled with the enclosure;
   a sealing element secured on the platform between the transparent protective cover and the enclosure to provide a barrier from a liquid entering an gap between the transparent protective cover and the enclosure, the sealing element comprising an aperture; and
   a restraining element disposed in the aperture and providing a support to the sealing element against a force provided by the liquid from moving the sealing element.

10. The electronic device of claim 9, wherein the restraining element is engaged with the enclosure and positioned to limit movement of the transparent protective cover with respect to the enclosure.

11. The electronic device of claim 9, wherein the aperture comprises a through hole that extends entirely through the sealing element.

12. The electronic device of claim 9, wherein the enclosure carries a blocking element positioned to limit movement of the sealing element relative to the platform when the liquid causes movement of the sealing element.

13. The electronic device of claim 12, wherein the blocking element is positioned to limit movement of the transparent protective cover with respect to the enclosure.

14. The electronic device of claim 12, wherein the blocking element comprises an operational component that includes at least an antenna or a circuit.

15. The electronic device of claim 12, wherein the transparent protective cover includes a notch having a size and a shape to receive a portion of the blocking element when a force actuates the transparent protective cover in a direction toward the blocking element.

16. A method for assembling a wearable electronic device having an enclosure defining an internal cavity and a transparent protective cover separated from the enclosure by a gap, the transparent protective cover comprising glass or sapphire, the method comprising:
  positioning the transparent protective cover over a display assembly having touch sensitive components;
  positioning the transparent protective cover over the display assembly;
  securing the transparent protective cover with the enclosure by a sealing element positioned to prevent a liquid from entering the internal cavity via the gap, the sealing element comprising a force detection sensor configured to detect a force applied to the transparent protective cover; and
  positioning support members at least partially around the sealing element to shield the sealing element from the liquid.

17. The method of claim 16, wherein positioning the support members at least partially around the sealing element comprises:
  positioning a first support member positioned between the transparent protective cover and the sealing element; and
  positioning a second support member positioned between the sealing element and the enclosure wherein each of the first support member and the second support member includes a first portion and a second portion perpendicular to the first portion, wherein the second portion of the second support member is at least partially positioned between the gap and the sealing element.

18. The method of claim 16, further comprising providing a blocking element positioned in the internal cavity to limit movement of the sealing element with respect to the enclosure.

19. The method of claim 16, further comprising:
  forming an aperture that extends entirely through the sealing element; and
  providing a restraining element in the aperture to prevent the liquid from driving the sealing element when the sealing element engages the restraining element.

20. The method of claim 19, wherein the support members comprise L-shaped brackets.

* * * * *